(12) United States Patent
Khudyakov et al.

(10) Patent No.: US 6,900,252 B2
(45) Date of Patent: May 31, 2005

(54) UV-CURABLE ACRYLATE COATINGS FOR FOOD PACKAGING

(75) Inventors: Igor Vladimir Khudyakov, Hickory, NC (US); Charles Ensley Hoyle, Haittiesburg, MS (US)

(73) Assignee: Alcatel, Paris (FR)

( * ) Notice: Subject to any disclaimer, the term of this patent is extended or adjusted under 35 U.S.C. 154(b) by 193 days.

(21) Appl. No.: 10/011,786

(22) Filed: Dec. 11, 2001

(65) Prior Publication Data

US 2003/0004223 A1 Jan. 2, 2003

Related U.S. Application Data

(60) Provisional application No. 60/291,008, filed on May 16, 2001.

(51) Int. Cl.$^7$ .................................. C08F 2/46
(52) U.S. Cl. ................. 522/182; 522/113; 522/121; 522/120; 522/180; 522/178; 427/508; 427/496; 427/487; 53/461
(58) Field of Search ................ 522/113, 120, 522/121, 180, 181, 178; 427/508, 496, 487; 53/461

(56) References Cited

U.S. PATENT DOCUMENTS

| 3,236,584 A | | 2/1966 | Degering |
| 4,824,919 A | * | 4/1989 | Baker et al. ................ 525/502 |
| 5,369,140 A | * | 11/1994 | Valet et al. .................... 522/75 |
| 5,725,909 A | | 3/1998 | Dawson et al. |

FOREIGN PATENT DOCUMENTS

| DE | 199 49 383 A | 4/2001 |
| EP | 0 125 710 A | 11/1984 |
| EP | 0 544 052 A | 6/1993 |

OTHER PUBLICATIONS

Oliva C et al., "Electron Paramagnetic Resonance and Electron–Nuclear Double Resonance Characterization of Radicals in Photopolymerized Multifunctional Methacrylates", Journal of the Chemical Society, Perkin Transactions 2, Chemical Society, Letchworth, GB, vol. 12, pp. 2133–2139.

* cited by examiner

Primary Examiner—James J. Seidleck
Assistant Examiner—Sanza L McClendon
(74) Attorney, Agent, or Firm—Sughrue Mion, PLLC

(57) ABSTRACT

There is provided a radiation-curable coating or packaging composition containing vinyl acrylate and one or more additional components, wherein the composition does not contain a photoinitiator, and the composition polymerizes upon irradiation. The irradiation forms a polymer that demonstrates thermal stability and abrasion resistance, and functions as a moisture barrier. The resulting polymer does not contain any photoinitiator and is therefore useful as a coating or packaging material for foods, or as a coating or packaging material for any application where the exclusion of photoinitiator, and especially residual photoinitiator, is preferred, such as an outdoor weatherable application. A feature of the invention is that the polymerization through exposure to radiation of a composition containing vinyl acrylate may also initiate the polymerization of one or more of the additional components within the composition that would not ordinarily polymerize in the absence of a photoinitiator.

13 Claims, 1 Drawing Sheet

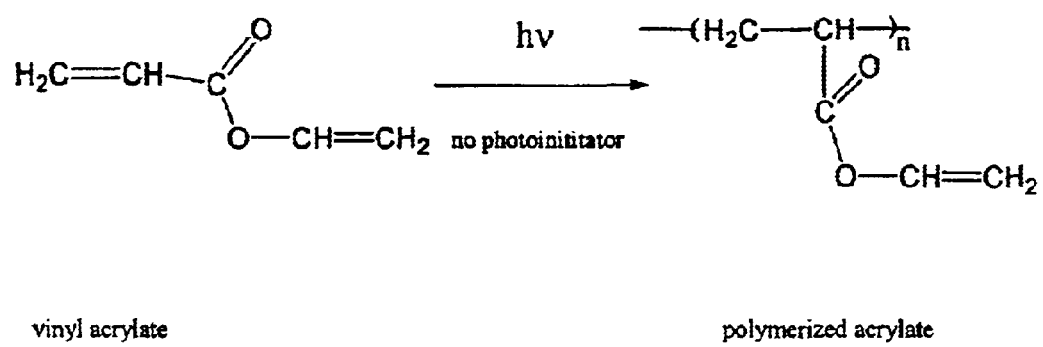
vinyl acrylate       polymerized acrylate

UV-CURABLE ACRYLATE COATINGS FOR FOOD PACKAGING

This application claims the benefit of U.S. Provisional Application No. 60/291,008, filed May 16, 2001.

BACKGROUND OF THE INVENTION

Radiation-curable coatings are currently being used in a wide variety of applications. One advantage of a radiation-curable coating is that it eliminates the need for conventional solvents. A second advantage is that radiation-curable coatings may be applied to virtually any type of substrate, including, e.g., glass, textile fabrics, leather, metal, paper, wood, and polymeric substrates.

Acrylate resin(s) comprising, for example, acrylate monomer(s), is commonly used in a radiation-curable coating layer. Examples of typical acrylate monomers may include both low and high molecular weight acrylates, for example, monoacrylates, diacrylates, and triacrylates, e.g., hexanediol diacrylate, isobornyl acrylate, diethylene glycol diacrylate, trimethylol propane triacrylate, and beta carboxy ethyl acrylate. However, polymerization of the acrylates via, for example, ultraviolet radiation, typically requires a photoinitiator.

The U.S. Food and Drug Administration prohibits the use of nearly all photoinitiators in food packaging materials because photoinitiators are capable of yielding hazardous products upon irradiation. Consequently, polyacrylate has typically been excluded from the list of materials used in food packaging applications, or any other application that benefits from the omission of photoinitiator or photoinitiator residue.

U.S. Pat. No. 4,070,500 to Leitner, et al. discloses radiation-curable vehicles, and compositions containing such vehicles, for use in inks, paints, coatings, or similar compositions, such vehicles being operative without the inclusion of photoinitiators. The '500 patent, however, is silent regarding a composition comprising vinyl acrylate.

U.S. Pat. No. 5,725,909 to Shaw, et al. discloses a thermoplastic container or packaging material coated with a crosslinked acrylate layer. The '909 patent, however, does not at all mention a composition comprising vinyl acrylate. The '909 patent, moreover, does not exclude photoinitiators from its compositions. In fact, the '909 patent states that a photoinitiator may be included in the acrylate layer in order to facilitate polymerization by ultraviolet radiation.

SUMMARY OF THE INVENTION

According to a preferred embodiment of the invention, there is provided a radiation-curable coating or packaging composition comprising vinyl acrylate and one or more additional components, wherein the composition does not contain a photoinitiator and the composition polymerizes upon irradiation. The irradiation forms a polymer that demonstrates thermal stability and abrasion resistance, and functions as a moisture barrier. The resulting polymer does not contain any photoinitiator and is therefore useful as a coating or packaging material for foods, or as a coating or packaging material for any application where the exclusion of photoinitiator, and especially residual photoinitiator, is preferred, such as an outdoor weatherable application.

BRIEF DESCRIPTION OF THE DRAWING

The drawing presents the reaction chemistry for a type of polymerization contemplated by the present invention. Specifically, vinyl acrylate undergoes polymerization via initiation by UV radiation. Photoinitiators are not employed in the process.

DETAILED DESCRIPTION OF THE INVENTION

According to a preferred embodiment, a radiation-curable coating composition comprises vinyl acrylate and one or more additional components.

Vinyl acrylate has the following structure:

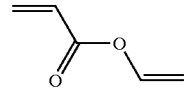

A feature of the invention is that the polymerization of the composition comprising vinyl acrylate through exposure to radiation may also initiate the polymerization of one or more of the additional components within the composition that would not ordinarily polymerize in the absence of a photoinitiator.

Accordingly, the one or more additional components of the present radiation-curable composition may comprise, for example, acrylate-containing compounds other than vinyl acrylate, such as difunctional acrylates, difunctional methacrylates, trifunctional acrylates, and trifunctional methacrylates.

Particular examples of acrylate-containing compounds that may be included in the present composition include isobornyl acrylate, urethane acrylate, urethane acrylate oligomers, hexane diol diacrylate, 1,6-hexanediol diacrylate, propone diacrylate, butane diol diacrylate, tripropylene glycol diacrylate, neopentyl glycol diacrylate, phenoxyethyl acrylate, lauryl acrylate, bisphenol A diacrylate, beta carboxy ethyl acrylate, and glycerol propoxy triacrylate. Examples of commercially available urethane acrylate oligomers include OD1-65, which is urethane acrylate coating available from DSM (Elgin, Ill.), and EBECRYL 230, which is difunctional urethane acrylate available from UCB Radcure (Smyrna, Ga.).

The present composition may also comprise one or more vinyl monomers other than vinyl acrylate.

The present composition may include from 5 wt % to 95 wt % of vinyl acrylate, for example, from 15 wt % to 80 wt % of vinyl acrylate, e.g., from 25 wt % to 65 wt % of vinyl acrylate, based on the total weight of the composition.

Thus, the present invention contemplates polymers and co-polymers that are the polymerization product of radiation-curable compositions comprising vinyl acrylate and one or more additional components, wherein the composition does not contain a photoinitiator.

The present invention also provides a method of making a radiation-curable coating or packaging, comprising polymerizing a composition comprising vinyl acrylate and one or more additional components by irradiating the composition, wherein the composition does not contain a photoinitiator.

In one embodiment of the present method for making a radiation-curable coating or packaging, the irradiated, polymerized composition by itself is used as a coating or packaging. Thus, the invention provides a method for packaging, for example, food, comprising the step of wrapping a food substance in a sheet of polymerized acrylate, wherein the polymerized acrylate is the product of irradiating a composition comprising vinyl acrylate and one or more additional components, and the composition does not contain a photoinitiator.

In another embodiment of the present method, a radiation-curable coating composition according to the present invention is applied to the surface of a substrate. The coated surface of the substrate is subsequently exposed to radiation to cure the coating onto the surface of the substrate. The coated substrate is then usable as a coating or packaging.

A wide variety of substrates may be coated with the present radiation-curable composition, including glass, textile fabrics, leather, metal, paper, wood, and plastic substrates, such as polymeric or oligomeric substrates. Generally, the choice of substrate will be tailored to the particular application. For example, for food packaging applications, the present composition may be applied onto the surface of any of the thermoplastic resins, such as polyolefin resins, typically used in the food packaging industry. Alternatively, the present composition may be applied onto the surface of an outdoor weatherable material.

The composition, whether it is the composition by itself, or the composition coated onto the surface of a substrate, may be exposed to any suitable radiation that will polymerize the composition, preferably ultraviolet radiation. For example, the present coating compositions may be cured by receiving a certain amount of ultraviolet radiation energy, such as, for example, the UV radiation energy received from an Iwasaki processor (model EYE GRANDALE of Iwasaki Electric Co., Ltd., Japan) with a 120 W/cm Uv-lamp and a conveyor belt speed of from 0.1 to 25 meters per minute, for example, from 1 to 10 meters per minute, e.g., about 3 meters per minute. In general, the present coating compositions may be cured by receiving UV radiation energy of around 500 mJ/cm$^2$ or more.

The invention is further illustrated by the following examples.

EXAMPLE 1

Vinyl acrylate (VA) and isobornyl acrylate (IBOA), both obtained from Aldrich (Milwaukee, Wis.), were blended according to a 50:50 wt % ratio of VA to IBOA. The blend was placed on the crystal of a Nicolet 870 FT IR device from Nicolet (Madison, Wis.), with operation in the ATR regime. An MCT/A detector was used. The thickness of the sample blend on top of the crystal measured 100 µm.

Irradiation of the blend with LV light in an air or nitrogen atmosphere resulted in the relatively fast disappearance of the twisting vibration band of the acrylate group at ~810 cm$^{-1}$, in the IR spectra of the blend. Other bands of acrylate at 1625 and 1406 cm$^{-1}$ disappeared as well. Irradiation was provided by a UV-spot light source, Lightningcure 200 of Hamamatsu (Bridgewater, N.J.). Thus, irradiating the blend of VA and IBOA resulted in the formation of a cured polymer solid at room temperature.

Irradiation of IBOA under the same conditions and for the same amount of time in the absence of VA, however, did not result in cured IBOA. In other words, the IR spectrum of IBOA did not change, within experimental error of its determination, in the absence of VA.

EXAMPLE 2

A blend for a primary coating for optical fiber was prepared. The blend consisted of 90 wt % of OD1-65 and 10 wt % vinyl acrylate (VA), obtained from Aldrich. OD1-65 has acrylate groups with their characteristic band at ~810 cm$^{-1}$ in IR spectrum. OD1-65 does not have any photoinitiators in its composition.

The blend was irradiated as in Example 1, i.e., on top of the diamond crystal from an IR spectrometer. Irradiation of the blend resulted in the gradual, complete disappearance of the band at 810 cm$^{-1}$, and thus in the cure of the coating.

Irradiation of OD1-65 under the same conditions and for the same amount of time in the absence of VA did not result in a cure of OD1-65. In other words, the IR spectrum of OD1-65 did not change, within experimental error of its determination, in the absence of VA.

EXAMPLE 3

1,6-Hexanediol diacrylate (HDDA), available from Aldrich, was irradiated with full light from a mercury lamp (150 W). Irradiating the HDDA did not cure the HDDA, i.e., the viscosity of HDDA did not increase, and IR spectra showed no acrylate group consumption, at 810 and 1409 cm$^{-1}$.

Next, a 50:50 wt % binary mixture of HDDA and vinyl acrylate (VA) was irradiated. By irradiating the binary mixture under the same conditions and for the same amount of time as the HDDA alone, the mixture was cured, resulting in the copolymerization of HDDA and VA.

The experiment was run so that the samples were not in contact with oxygen from the air. Accordingly, the residual oxygen in the acrylates was quickly consumed shortly after the beginning of the cure.

The cure kinetics of HDDA and VA were measured by real time FT IR, monitoring the disappearance of the band at 1409 cm$^{-1}$.

EXAMPLE 4

A mixture of 90 wt % difunctional urethane acrylate EBECRYL 230 and 10 wt % vinyl acrylate was prepared. A "resin sandwich" was made between two standard microscope slides. Adhesive tape of a thickness of approximately 0.1 mm was used as a spacer.

Irradiating the mixture with UV-light from a Lightningcure light source (60 mW/cm$^2$) for 5 minutes cured the mixture, i.e., resulted in the copolymerization of the mixture, and formed an elastomer from viscous liquid.

On the other hand, irradiation of EBECRYL 230 in the absence of VA under the same conditions and for the same amount of time did not result in photopolymerization.

What is claimed is:

1. A radiation-curable coating or packaging composition comprising vinyl acrylate and one or more additional components, wherein the composition does not contain a photoinitiator, the composition polymerizes upon irradiation, and the radiation is ultraviolet radiation.

2. The radiation-curable coating or packaging composition of claim 1, wherein the one or more additional components comprise at least one acrylate-containing compound other than vinyl acrylate.

3. The radiation-curable coating or packaging composition of claim 2, wherein the at least one acrylate-containing compound other than vinyl acrylate is selected from the group consisting of isobornyl acrylate, urethane acrylate, and 1,6-hexanediol diacrylate.

4. The radiation-curable coating or packaging composition of claim 1, wherein the composition contains from 5 wt % to 95 wt % of vinyl acrylate, based on the total weight of the composition.

5. A food packaging material comprising the radiation-curable composition of claim 1.

6. An outdoor weatherable material comprising the radiation-curable composition of claim 1.

7. A method of making a radiation-curable coating or packaging, comprising polymerizing a composition comprising vinyl acrylate and one or more additional components by irradiating the composition, wherein the composition does not contain a photoinitiator, and the radiation is ultraviolet radiation.

8. The method of claim 7, wherein the one or more additional components comprise at least one acrylate-containing compound other than vinyl acrylate.

9. The method of claim 8, wherein the at least one acrylate-containing compound other than vinyl acrylate is selected from the group consisting of isobornyl acrylate, urethane acrylate, and 1,6-hexanediol diacrylate.

10. The method of claim 7, wherein the composition contains from 5 wt % to 95 wt % of vinyl acrylate, based on the total weight of the composition.

11. The method of claim 7, wherein the radiation-curable coating or packaging is a food packaging material.

12. The method of claim 7, wherein the radiation-curable coating or packaging is outdoor weatherable material.

13. A method for packaging food, comprising wrapping a food substance in a sheet comprising polymerized acrylate, wherein the polymerized acrylate is the product of irradiating a composition comprising vinyl acrylate and one or more additional components, and the composition does not contain a photoinitiator.

* * * * *